United States Patent [19]

Berkowitz

[11] 4,001,841

[45] Jan. 4, 1977

[54] RECORDING HEAD ARRAY WITH PASSIVE POLE

[75] Inventor: Ami E. Berkowitz, Schenectady, N.Y.

[73] Assignee: General Electric Co., Schenectady, N.Y.

[22] Filed: Apr. 25, 1975

[21] Appl. No.: 571,595

[52] U.S. Cl. .............................. 346/74.1; 360/125; 360/121

[51] Int. Cl.$^2$ .................... G03G 19/00; G11B 5/27

[58] Field of Search .......... 346/74.1; 360/121, 122, 360/125, 118, 115, 123

[56] References Cited

UNITED STATES PATENTS

| | | | |
|---|---|---|---|
| 2,901,676 | 8/1959 | Mittag | 360/125 |
| 3,041,413 | 6/1962 | Williams | 360/125 |
| 3,156,919 | 11/1964 | Rutter | 360/125 |
| 3,414,893 | 12/1968 | Coccagna | 360/125 |
| 3,550,150 | 12/1970 | Gardener | 360/125 |

*Primary Examiner*—Jay P. Lucas
*Attorney, Agent, or Firm*—Jack E. Haken; Joseph T. Cohen; Jerome C. Squillaro

[57] ABSTRACT

A recording head array for magnetic printing machines comprises a flat sheet pole spaced from a line of magnetic pin poles. Spaces between image elements recorded by adjacent poles are thereby reduced. The sheet pole may be magnetized to provide a direct current bias field.

11 Claims, 4 Drawing Figures

Fig. 1 PRIOR ART
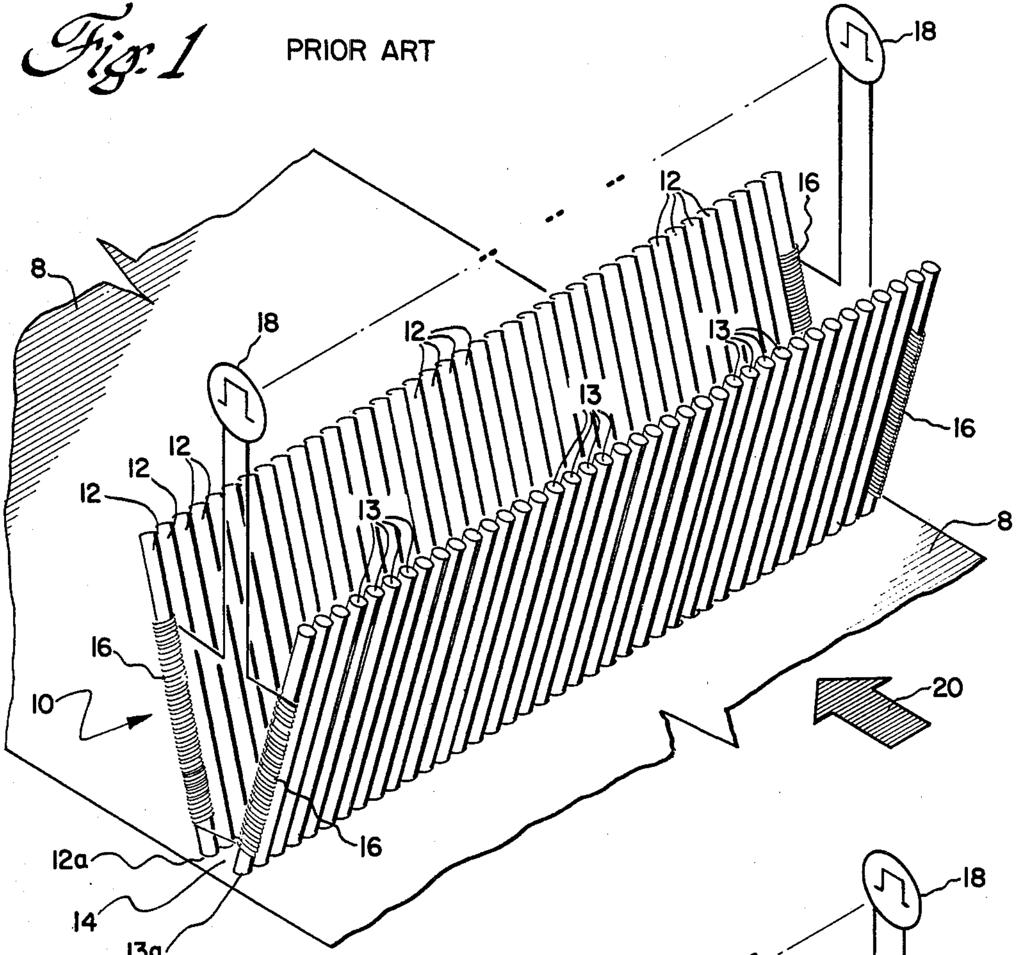
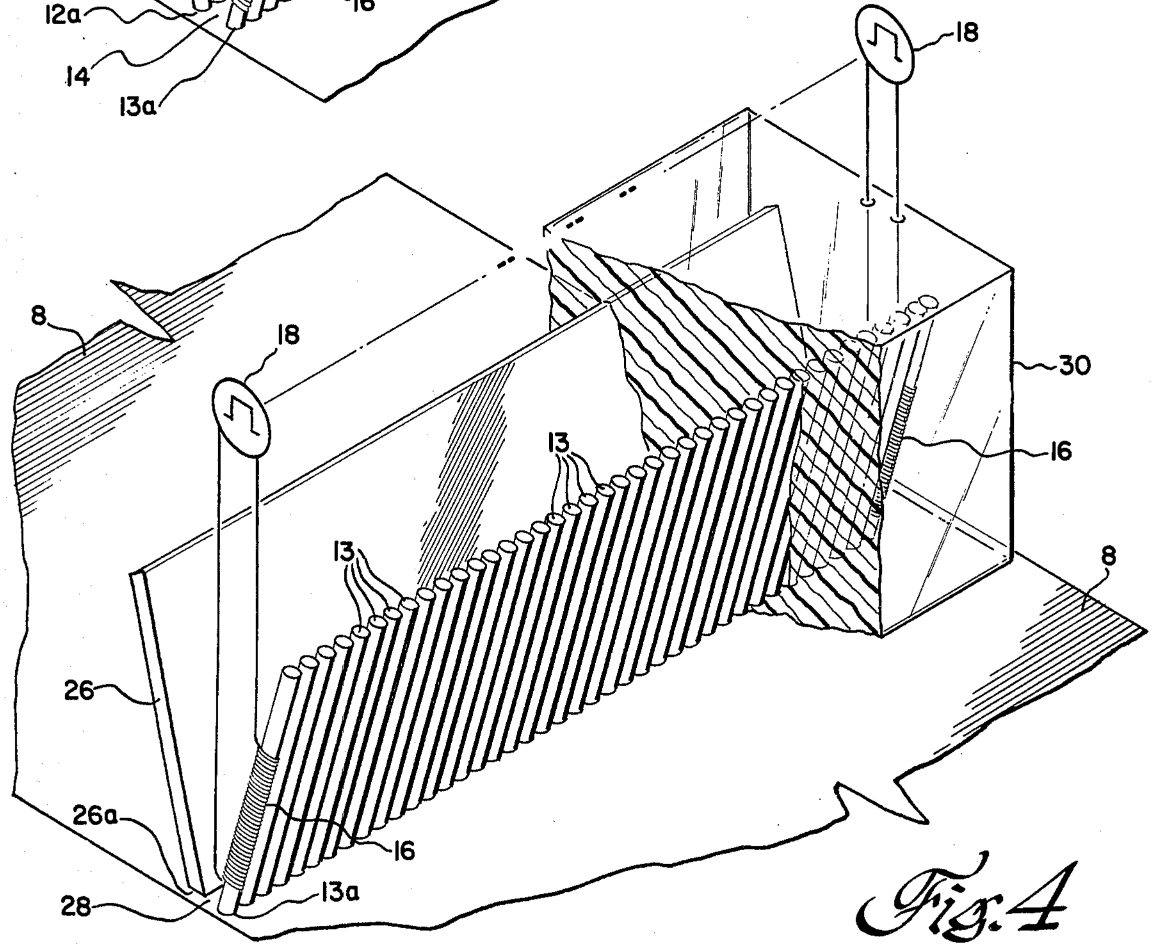
Fig. 4

RECORDING HEAD ARRAY WITH PASSIVE POLE

CROSS REFERENCE AND INCORPORATION BY REFERENCE

This patent application is related to copending patent application Ser. No. 571,594 of common assignee as the instant application, the entire disclosure of which is incorporated herein by reference.

BACKGROUND OF THE INVENTION

This invention concerns arrays of magnetic recording heads for use in magnetic printing applications. More specifically, this invention concerns arrays of recordings heads comprising a plurality of active pin poles and a passive sheet pole.

Machines for producing printed copy from a latent image which is recorded on a magnetic medium are well known to the reproduction arts. Typically, an original image is optically scanned to produce an electrical signal which varies in intensity with the brightness of the original image. The electrical signal, which may for example be stored and regenerated in a computer memory, is applied to magnetic recording heads which produce a sequentially varying magnetic field. The surface of a magnetic recording medium, for example, a drum or an oxide coated tape, moves past the recording heads through the varying magnetic field. A latent magnetic image corresponding to the brightness of an original image is thus recorded in the surface of the magnetic medium. A magnetic ink which may be in the form of dry particles comprising finely divided ferromagnetic powder and a thermoplastic resin, is applied to the surface of the recording medium where it is attracted by the magnetic field variations of the latent image. The ink image is then transferred from the magnetic medium to a final copy material, typically paper, by any of a variety of well known processes which include electrostatic transfer and pressure transfer. The latent magnetic image may then be re-inked for printing additional copies or erased to permit the recording medium to be used for printing a new image.

The resolution of a magnetic printing system increases with the number of separate picture elements recorded in a given area, and therefore, decreases with the size of the picture elements. In one embodiment of a magnetic printing system, a linear array of recording heads is used to record a line of picture elements on the recording medium. The recording medium moves past the recording heads and a series of such lines generate a two-dimensional image. The resolution along such a line is inversely proportional to the spacing between recording heads in the array. High resolution printing, therefore, requires a recording head array with small center-to-center spacing between heads.

Typical magnetic printing systems of the present art require linear arrays including hundred or thousands of recording heads. Such arrays can be most economically produced as integrated assemblies.

One conventional embodiment of a recording head array for use in magnetic printing systems comprises pairs of permeable pin cores which are wrapped with field coils to form recording head poles. Magnetic fields for recording are induced between the poles of each pin pair.

SUMMARY OF THE INVENTION

In accordance with the present invention, I provide an integrated, linear array of magnetic recording heads. A common pole comprises a flat strip of magnetic material oriented along the line of the array and forming a small angle with a plane normal to the surface of the recording medium. A linear array of parallel, pin poles is disposed along a line on the recording medium lying parallel to the common poles. The pin poles are wrapped with field coils in a manner typical of the conventional pin core recording heads. The magnetic recording fields of the present invention, however, are formed across gaps between the pin poles and the common pole at the surface of the recording medium. The present invention, therefore, eliminates one-half of each pin pole pair of prior art recording head array embodiments. The magnetic field produced between the pin poles and the common pole of the present invention tends to fill the gap area between the pin poles and thereby to produce larger recorded picture elements than do prior art array embodiments. The elimination of half the magnetic pin cores and associated windings allows a substantial reduction in the production costs of recording head arrays.

It is, therefore, an object of this invention to provide pin core recording head arrays having substantially lower production costs than do recording head arrays of the prior art.

Another object of this invention is to provide linear pin type recording head arrays which are adapted for producing image elements with smaller gaps between them than the image elements produced by other linear recording head arrays.

BRIEF DESCRIPTION OF THE DRAWINGS

The novel features believed to be characteristic of the present invention are set forth in the appended claims. The invention itself, together with further objectives and advantages thereof, may best be understood with reference to the following detailed description, taken in connection with the appended drawings in which:

FIG. 1 is a typical magnetic printing head comprising pin, core elements.

FIG. 4 is a recording head array of the present invention which comprises a common, sheet pole.

DESCRIPTION OF THE PREFERRED EMBODIMENT

Figure 2:
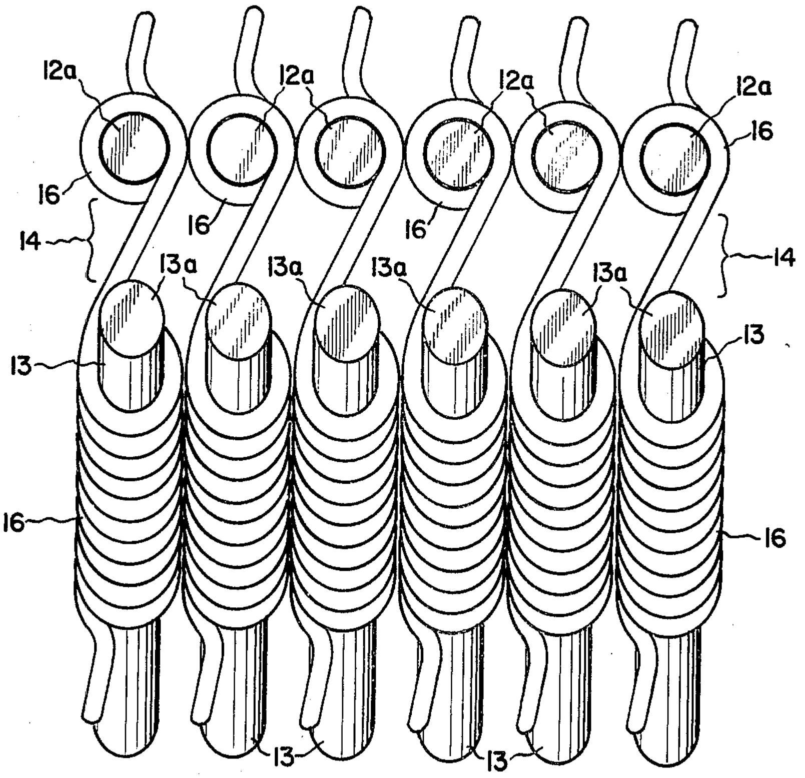
PRIOR ART Fig. 2
FIG. 2 is a sectional view through the pin poles in the recording head array of FIG. 1.

FIG. 1 is a conventional head array for use in magnetic printing machines. The array comprises a plurality of recording heads 10 disposed in a straight line along a recording plane 8. Each recording head 10 includes a first pin core 12 and a second pin core 13. The pin cores 12 and 13 comprise permeable magnetic material and may, for example, be iron or a nickel-iron alloy. One end of each pin core 12 and 13 is flattened to form parallel, coplanar recording poles **12*a* and 13*a*, respectively. The recording poles 12*a* and 13*a* lie in the recording plane 8 and define a recording gap 14**.

The pin cores 12 and 13 are each wrapped with a multi-turn winding 16 comprising fine conductive wire and an insulating enamel. The exciting winding 16 in each recording head is connected in series with a current driver circuit 18. The driver circuit 18 produces current flow in the windings 16 on the pin cores 12 and 13 which induces a magnetic field in the pin cores 12 and 13 and across the gap 14 formed by the poles 12*a* and 13*a*. In typical magnetic printing systems, each recording head is connected to a separate current driver 18 and functions to induce a magnetic field image element between its recording poles 12*a* and 13*a* in the recording plane 8. In such typical magnetic printing applications, the surface of a magnetic recording medium moves past the head array in the recording plane 8 in the direction 20. Successive lines of magnetic image elements are induced and recorded on the medium surface by the linear array of recording head gaps 14. The successive lines of image elements form a two-dimensional latent magnetic image on the recording medium surface.

Figure 3:
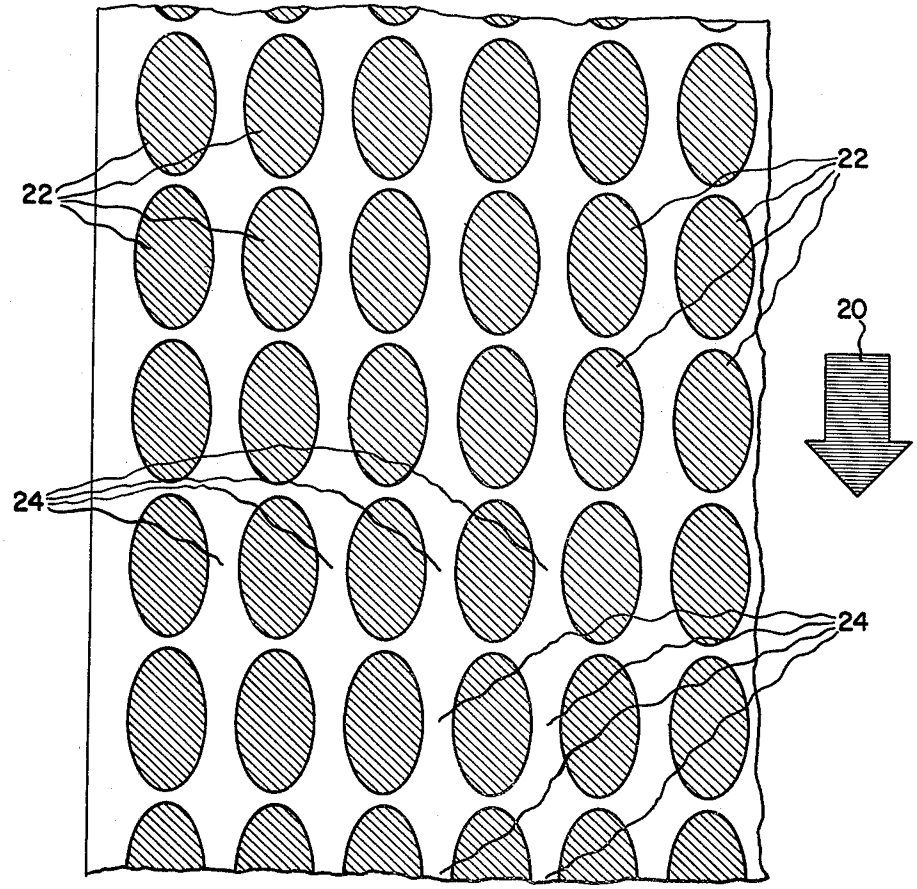
FIG. 3 is a pattern of picture elements recorded by the array of FIGS. 1 and 2.

FIG. 2 is an end view of the recording head array along the axis of the pin cores 12. It may be seen that the minimum spacing between adjacent recording poles 12*a* is limited by the thickness of adjacent exciting windings 16: that is, the spacing between adjacent pin cores members can be no less than twice the thickness of the wire in the exciting windings 16. FIG. 3 is a typical section of a latent magnetic image recorded by the head array of FIG. 2. The magnetic image element 22 induced between pole pairs 12*a* and 13*a* has substantially the same width as the diameter of the pin cores 12 and 13. The elements 22 of the latent magnetic image which are written by adjacent recording heads must be separated by an unrecorded space 24 having a width at least equal to twice the thickness of the exciting windings 16.

In accordance with the present invention, FIG. 4, I have replaced one set of pin core members 12 in the above-described magnetic recording head array with a single common pole member 26. A plurality of pin core members 13 of the type described above are disposed at an acute angle to the common pole 26. One edge of the common pole 26*a* and one pole 13*a* of each pin core 13 define a recording gap 28 in a recording plane 8. Each pin core 13 is wrapped with an exciting winding 16 which is connected to a driver circuit 18 in the manner described above. The recording head assembly, comprising the common pole 26, the plurality of pin cores 13, and the windings 16 may be encapsulated in a plastic resin block 30 for added rigidity. Driver circuits 18 cause electrical current flow in the windings 16 and to induce a magnetic field in the pin cores 13. The magnetic field in each of the pin cores 13 acts to induce a magnetization in the portion of the common pole 26 adjacent to that pin pole. The magnetization induced in the common core occupies a larger volume than that associated with the pin core 12 in the head embodiment of FIG. 1. The size of the magnetic image elements produced by recording head arrays of the present invention is, therefore, wider than that of the elements produced by the array of FIG. 1. The space between adjacent image elements may, by use of the magnetic recording head of the present invention, be decreased.

The magnetic recording head array of the present invention contains only one-half the number of wound pin cores as does the embodiment of FIG. 1. The costs of winding and positioning the pin cores 12 and 13 are a substantial portion of the production cost of the recording head array and the over-all cost of the array of the present invention is therefore reduced in respect to that of the embodiment of FIG. 1.

The current in the exciting winding 16 of the recording head of the present invention (FIG. 4) must necessarily, be greater than the recording current required to produce an equivalent magnetic recording field strength in the head array of FIG. 1. The recording current of the present invention may be reduced if the common pole 26 and the pin array 13 are partially magnetized with a permanent magnet that produces a bias field in a manner more fully described in concurrently filed patent application Ser. No. 571,594.

By way of illustration only, in a typical recording head array of the present invention, the pin cores 13 comprise 0.2 mm diameter 50% Fe–50% Ni wire wrapped with 30-turn windings 16 of 0.03 mm copper conductor. The pin cores are mounted in a parallel planar array o 0.27 mm centers and form a 30° angle with a 79% Ni – 21% Fe sheet common pole 26. The recording gap 28 is approximately 0.025 mm. Alternately, the common pole may comprise a permanent magnet sheet including Cu, Ni and Fe that is magnetized to the remanent state.

It may be seen, therefore, that the present invention provides a magnetic recording head, useful with magnetic printing systems, having increased recorded spot size and reduced manufactured cost as compared with former magnetic recording head designs.

While the invention has been described in detail in accord with certain embodiments thereof, many modifications and changes therein may be effected by those skilled in the art. Accordingly, it is intended by the appended claims to cover all such modifications and changes as fall within the true spirit and scope of the invention.

The invention claimed is:

1. A magnetic recording head array comprising:

a flat sheet of magnetic material having a straight edge defining a first pole;

a compound second pole comprising a plurality of cores comprising straight pins of magnetic material, one end of each of said pins defining a pin pole, said pins being disposed in a plane forming an acute angle with said sheet and further being, at all points, separated from said sheet to define a gap therebetween, the permeability of said gap being substantially less than the permeability of said magnetic materials, said ends of said pins being further disposed on a straight line lying parallel to said edge of said sheet in a recording plane; and a plurality of conductive windings wrapped on said cores.

2. The array of claim 1 wherein said ends of said pins and said edge of said sheet are coplanar flat surfaces disposed in said recording plane.

3. The array of claim 2 whrein one of said conductive windings is wrapped on each of said pin cores.

4. The array of claim 3 wherein said windings comprise insulated wire.

5. The array of claim 4 wherein said pin cores are disposed parallel, one to another.

6. The array of claim 5 wherein adjacent pin cores are separated by the sum of the thicknesses of said windings on said adjacent cores.

7. The array of claim 6 wherein said cores and said windings are encapsulated in a dielectric material.

8. The array of claim 1 wherein said pin cores are approximately 50% iron and approximately 50% nickel.

9. The array of claim 1 wherein said sheet comprises a permanent magnet.

10. The array of claim 1 further comprising a plurality of drive circuit means each of said circuit means being connected in series with one or more of said windings.

11. The array of claim 1 wherein said sheet comprises permalloy.

* * * * *